June 1, 1926.                     1,587,236
K. T. KELLER
STEERING WHEEL
Filed Sept. 1, 1922        2 Sheets-Sheet 1

Inventor
Kaufman T. Keller
By his Attorneys
Blackmore, Spencer & Flint

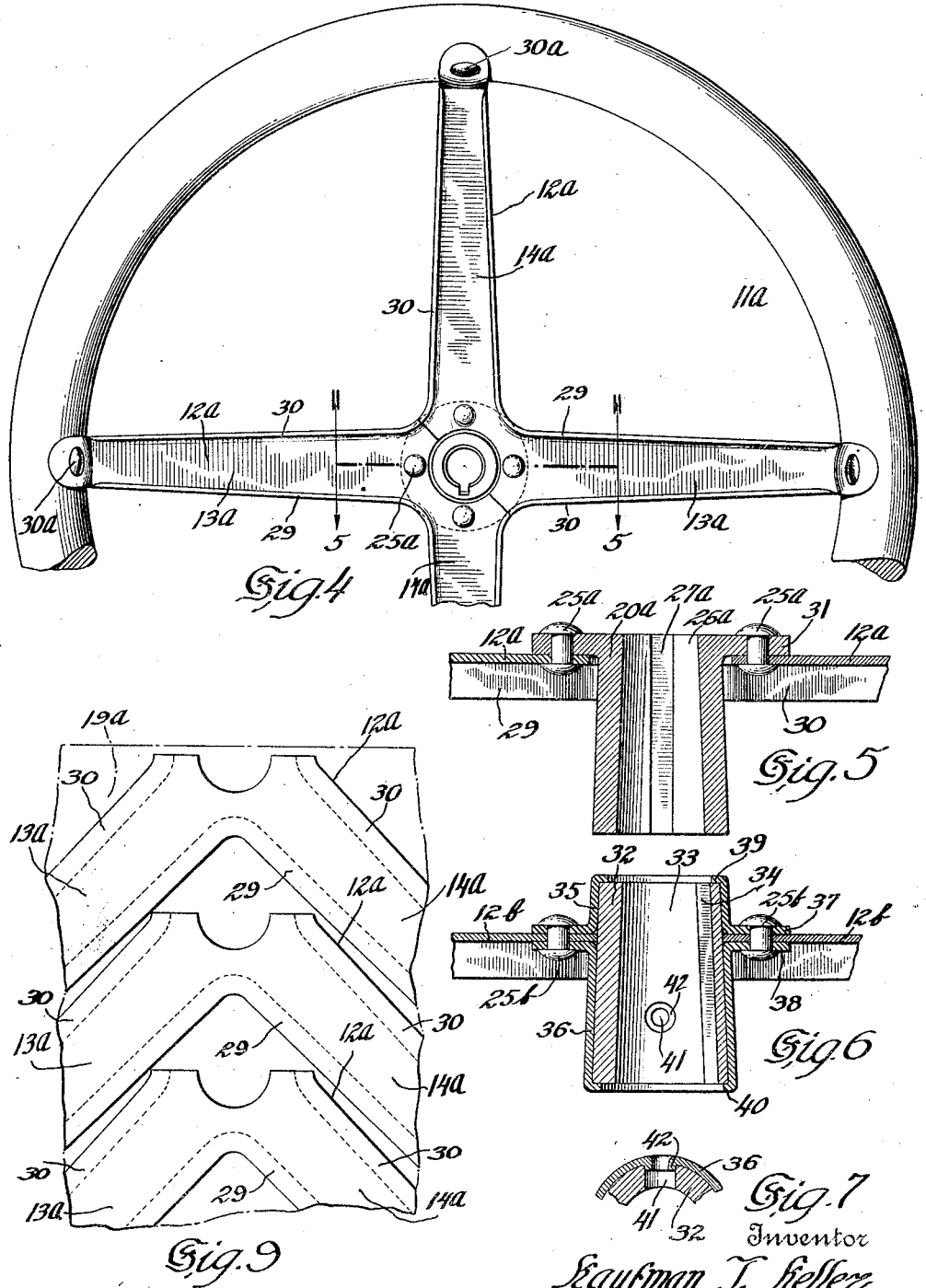

Patented June 1, 1926.

1,587,236

UNITED STATES PATENT OFFICE.

KAUFMAN T. KELLER, OF DETROIT, MICHIGAN, ASSIGNOR TO GENERAL MOTORS CORPORATION, OF DETROIT, MICHIGAN, A CORPORATION OF DELAWARE.

STEERING WHEEL.

Application filed September 1, 1922. Serial No. 585,711.

This invention relates to motor vehicles and more particularly to steering wheels therefor.

Some of the objects of the invention are the provision of a steering wheel in which the spokes thereof may be stamped from sheet metal in such a manner that not only will a minimum amount of scrap be produced in the stamping operation but the parts when assembled will form a wheel that is simple in construction, strong, durable and that is not likely to get out of order or become distorted by long or continued use.

Other and further objects and advantages of the invention will appear from the description taken in connection with the accompanying drawings, in which—

Figure 4 is a bottom plan view of a modified form of steering wheel with parts broken away;

Figure 5 is a section on line 5—5 of Figure 4;

Figure 6 is a view similar to Figure 5, showing a slightly modified form of construction;

Figure 7 is a detail view;

Figure 9 is a view similar to that shown in Figure 3, showing a modified form of spoke blank.

In the construction of steering wheels in which the spokes are made from sheet metal, it is common practice to make each spoke separate from the remaining ones and to secure them to the rim and hub by means of rivets or other fastening means, but, owing to the strains to which the spokes are subjected they become loose and distorted during the normal use of the wheel. It has been proposed to form all the spokes of the steering wheel integral with each other and in some instances the opposite spokes alone are made integral, but both of these forms are objectionable, the former because of the loss of too much scrap material in the stamping or punching operation, and the latter because it is too difficult to secure the spokes to the hub in a manner sufficiently rigid and secure for a structure of this nature. Both of these objectionable features are eliminated by the construction which will now be described.

Figure 1:
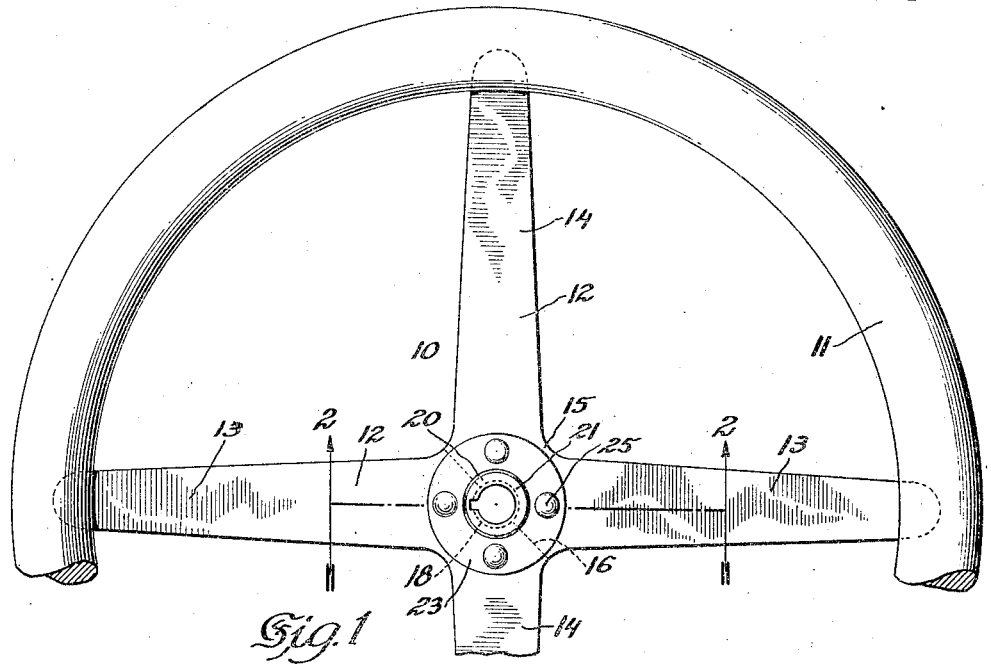
Figure 1 is a top plan view of a steering wheel embodying the invention, with parts broken away.
Figure 3:
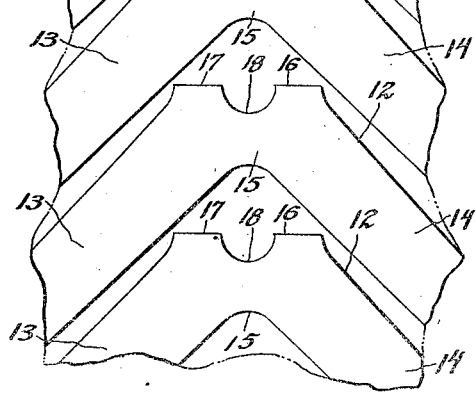
Figure 3 is a view indicating how the spoke blanks are cut from sheet metal.
Figure 2:
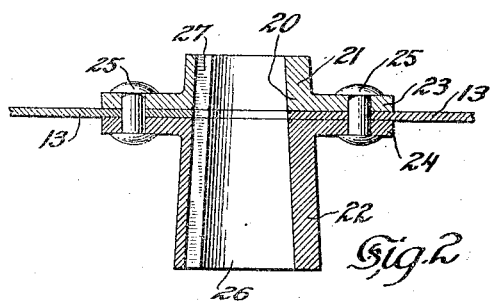
Figure 2 is a section on line 2—2 of Figure 1.

On Figs. 1, 2 and 3 of the drawings, the reference numeral 10 designates a steering wheel, having the rim 11 to which the spoke units or sets 12 may be secured in any suitable manner. Each spoke unit 12 comprises a body portion and one or more spokes. As shown on the drawings each unit includes a pair of spokes 13 and 14 connected together by a body portion 15. The body portion 15 is provided with shoulders 16 and with an intermediate semi-circular recess 18.

The spoke units or sets 12 may be stamped or punched from sheet metal plates with but little loss in material. They may be stamped or punched successively or simultaneously from sheet metal plates 19 in a manner indicated by the nested relation of the blanks in Fig. 3.

In assembling the spoke units or sets, the shoulders 16 of one unit or set engage the corresponding shoulders of the other unit or set thus forming a circular opening as indicated in Fig. 1, for the reception of the steering shaft.

Any suitable form of hub may be employed for securing the spokes in assembled relation. As shown in Fig. 2, the hub 20 consists of an upper section and a lower section. The upper section comprises a boss 21 extending upwardly from the flange 23 and the lower section comprises a boss 22 extending downwardly from the flange 24. Suitable means such as the rivets 25 are provided for clamping the spoke units or sets between the flanges 23 and 24. It will be noted that the shoulders 16 engage at each side of the hub whereby when the device is assembled the rivets and the shoulders 16 cooperate to provide a firm and rigid spoke assembly that is not likely to become loose nor distorted in any manner during the normal use of the steering wheel.

The hub sections are provided with axial bores that are adapted to aline with each other and with the opening formed by the recesses 18, to form a bore 26. The bore 26 may be tapered and have a keyway 27 for securing the steering wheel to the steering shaft in the usual manner. The spokes 13 and 14 may be secured to the rim 11 in any suitable manner.

In the modified form of the device shown in Fig. 4 the spoke units or sets 12ª are provided with flanges 29 and 30. The flange 29 is continuous, while the flange 30 on one spoke unit is so constructed that it cooperates with the corresponding flange 30 on the other unit to form a continuous flange when the wheel is assembled.

The spoke units or sets 12ª are stamped from sheet metal plates 19ª in any suitable manner but preferably in a manner similar to that described above and as indicated in Figure 9. The spoke blanks are bent along the dotted lines shown in Figure 9 to form the flanges 29 and 30. These flanges may be formed either during or subsequent to the spoke unit forming operation.

Any suitable hub construction may be employed. In the form shown in Figs. 4 and 5, the hub 20ª is provided at one end thereof with a flange 31 to which the spoke units 12ª are secured as by means of the fastening elements 25ª. The hub may be provided with a conical bore 26ª and keyway 27ª for securing the wheel to the steering shaft in the usual or well-known manner.

The outer ends of the spokes 13ª and 14ª are secured to the rim 11ª in any suitable manner as by means of the screws 30ª, as is common in such constructions.

In the modified form of hub construction shown in Figures 6 and 7, the hub comprises a central member or hub section 32 having the usual bore 33 and keyway 34 therein, and two cup-shaped stampings or sleeve members 35 and 36 engaging the ends of the central member. The sleeve members 35 and 36 are provided with the flanges 37 and 38, respectively, between which the spoke units 12ᵇ are adapted to be clamped and secured in position, as by the use of suitable fastening means 25ᵇ. The sleeve members 35 and 36 are provided with openings in alinement with the opening 33. The flanges 39 and 40 on the members 36 and 37 are adapted to engage the top and lower ends, respectively, of the central member 32 to assist in holding the parts in assembled relation. The sleeve members 35 and 36 are prevented from rotating on the central member or hub section 32 by any suitable means, as by providing a transverse bore 41 in the hub section (see Figs. 6 and 7) into which a portion of the metal 42 of the sleeve 36 may be depressed, by means of a punch or other suitable tool, after the parts have been assembled.

Figure 8:
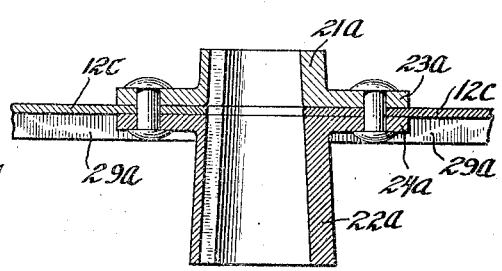
Figure 8 is a view similar to Figure 2 of a modified form.

The form of the hub assembly shown in Figure 8 differs from that shown in Figure 2 in that the spoke units 12ᶜ clamped between the flanges 23ª and 24ª of the hub sections 21ª and 22ª are provided with flanges 29ª for reinforcing or strengthening the spoke units.

It will be understood that various changes in the form, construction, composition and arrangement of the several parts may be resorted to without departing from the spirit and scope of my invention; hence I do not wish to limit myself strictly to the structure herein set forth, but

What I claim is:

1. In a device of the class described, a rim, sheet metal spokes secured thereto, an upper hub section comprising a flange and a boss, a lower hub section comprising a flange and a boss, and means for clamping said spokes between said flanges.

2. In a device of the class described, a rim, sheet metal spokes secured to said rim, a hub member, sleeve members mounted on said hub member and means for clamping said sleeve members to said spokes.

In testimony whereof I affix my signature.

KAUFMAN T. KELLER.